ERROR-VOLTAGE-SENSITIVE DIFFERENTIAL AMPLIFIER

Filed Feb. 10, 1950 3 Sheets-Sheet 1

INVENTOR
B. M. OLIVER
BY Hugh S. Wertz
ATTORNEY

Nov. 29, 1955 B. M. OLIVER 2,725,424

ERROR-VOLTAGE-SENSITIVE DIFFERENTIAL AMPLIFIER

Filed Feb. 10, 1950 3 Sheets-Sheet 2

INVENTOR
B. M. OLIVER
BY Hugh S. Wertz
ATTORNEY

ERROR-VOLTAGE-SENSITIVE DIFFERENTIAL AMPLIFIER

Filed Feb. 10, 1950 3 Sheets-Sheet 3

INVENTOR
B. M. OLIVER
BY Hugh S. Wertz
ATTORNEY 2,725,424
Patented Nov. 29, 1955

2,725,424

ERROR-VOLTAGE-SENSITIVE DIFFERENTIAL AMPLIFIER

Bernard M. Oliver, Morristown, N. J., assignor to Bell Telephone Laboratories, Incorporated, New York, N. Y., a corporation of New York Application February 10, 1950, Serial No. 143,462

4 Claims. (Cl. 178—7.3)

This invention relates to television and more specifically to automatic frequency controlled horizontal sweep circuits in television receivers.

An object of this invention is to produce more stable horizontal sweep operation in television receivers than has hitherto been possible.

Another object is to simplify, and reduce the power required in, the automatic frequency control of horizontal sweep generators used in television receivers.

In early television receivers, the horizontal sweep generator consisted of a relaxation oscillator of one kind or another in which each cycle of operation was initiated or "triggered" by the particular synchronizing pulse received at that time from the transmitting station. Experience with such receivers indicated that degradation of the picture due to faulty synchronization in the presence of noise was more serious, in most cases, than the picture degradation produced by the noise in the picture itself. This experience led to the development of AFC (automatic frequency controlled), or "fly-wheel," synchronizing circuits.

In one well-known AFC synchronizing system, the phase of a local sine wave oscillator is compared with the received train of synchronizing pulses and any discrepancy is averaged over a number of pulses. This average error is used to develop a control signal to readjust the oscillator frequency. Thus the start of any one cycle is determined not merely by the particular synchronizing pulse received at that time, but also by a number of synchronizing pulses received in the past. If $n$ is the effective number of synchronizing pulses averaged to obtain this reference time, the RMS timing error, due to noise, is $$\frac{1}{\sqrt{n}}$$

as great as in the simple triggered sweep.

More specifically, in the sine wave system mentioned above, the local oscillator is coupled to a phase detector, comprising a pair of diodes, through a discriminator transformer. The horizontal synchronizing pulses, which have been amplified and separated from the composite RMA television signal by previous circuits in the system, are also applied to this phase detector. A voltage, of a polarity depending upon the relative phase of the oscillator signal and the incoming synchronizing pulse, is produced across load resistors in circuit with the diodes. Rapid changes in this control voltage, as a result of noise perturbations of the synchronizing pulse time, are attenuated by an integrating network. The filtered voltage output of this network is applied to a reactance tube shunting the oscillator tuned circuit. Normal drifts in the oscillator circuit tending to change this frequency (and therefore its phase) cause a correcting voltage to be applied to the reactance tube which restores the frequency and phase of the oscillator to the frequency of repetition of the synchronizing pulses. The present invention relates, in one of its more important aspects, to the improvement in the phase stability of AFC horizontal saw-tooth sweep generators of the type just described.

In accordance with the present invention, the fly-back portion of a horizontal saw-tooth wave is compared in phase with the corresponding synchronizing pulse and the potential difference across a network resulting from the phase comparison is used to stabilize a blocking oscillator used in the sweep generator. In a circuit constructed in accordance with the invention, it has been found that much greater phase stability results than in the corresponding circuit now used in most commercial television receivers and at the same time it requires much less power than commercially used circuits of the AFC type.

The invention will be more readily understood by referring to the following description taken in connection with the accompanying drawings forming a part thereof in which.

Figure 1:
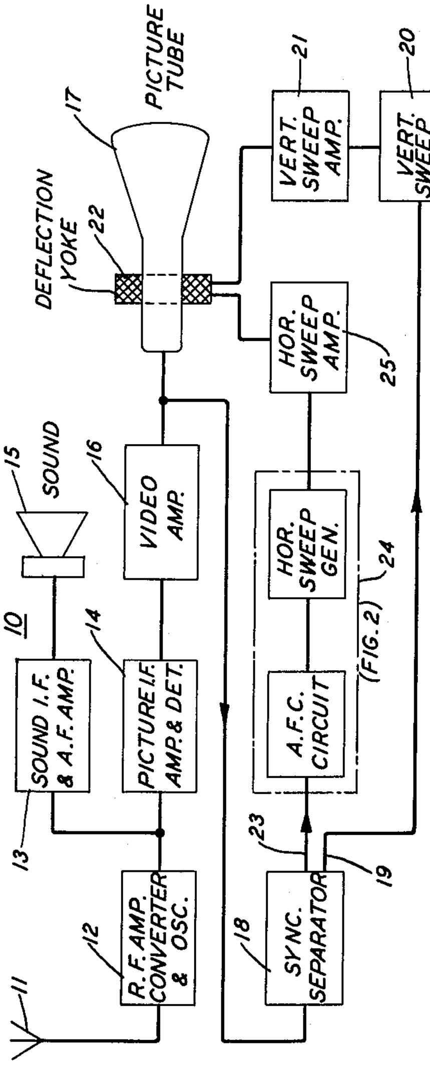
Fig. 1 is a block diagram of a television receiver system employing an automatic frequency controlled horizontal sweep circuit in accordance with the invention.
Figure 2:
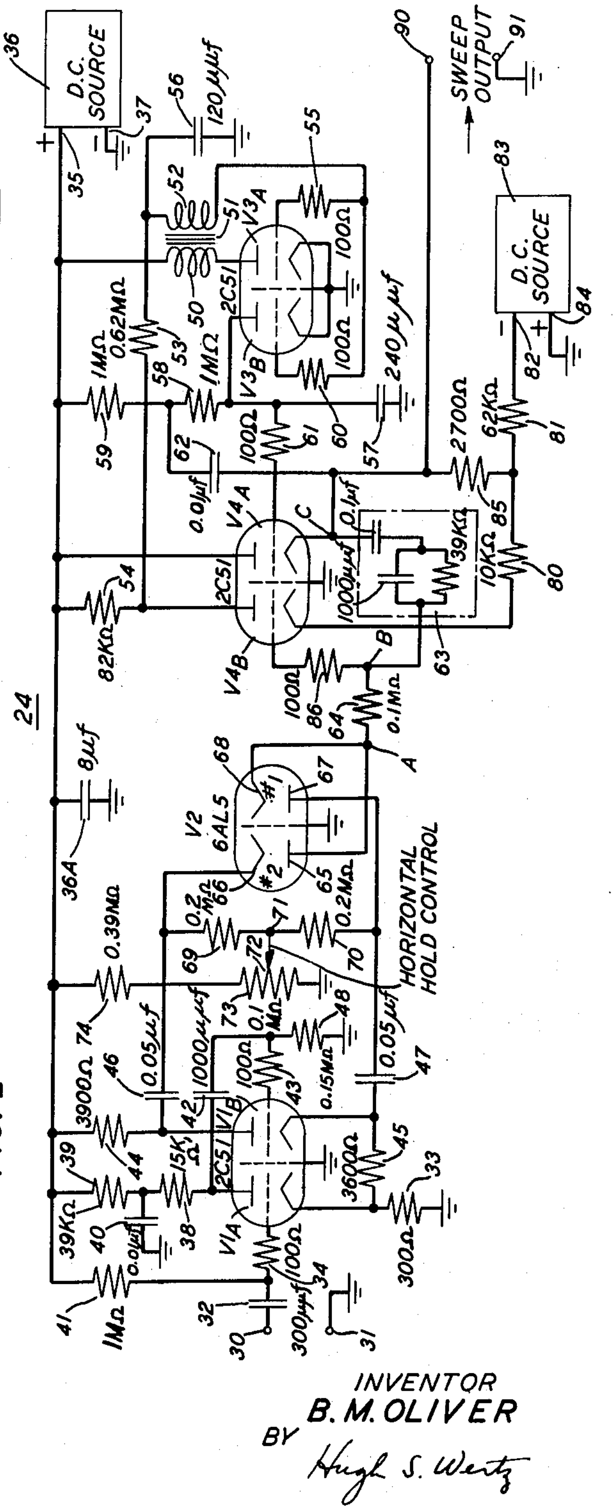
Fig. 2 is a circuit diagram of an AFC horizontal sweep generator in accordance with the invention.

Referring more specifically to the drawings, Fig. 1 shows, by way of example for purposes of illustration and in block diagram form, a typical television receiver 10 which has been modified to embody an AFC horizontal sweep generator in accordance with the invention. The incoming television signal is received by the antenna and applied to the apparatus represented by the block 12 where it is amplified and converted to an intermediate frequency. The radio frequency amplifier, the converter, and the oscillator making up the apparatus represented by the block 12 are of any well-known form and hence will not be described in detail here. The sound and picture modulated carriers are then separated and applied to the corresponding sound and picture intermediate frequency amplifiers 13 and 14 respectively and therein detected and amplified. The sound is reproduced by the loudspeaker 15 while the picture (video) signal is applied to the video amplifier 16 and the output thereof is used to modulate the picture tube 17. The video signal occurring in the output of the video amplifier 16 is also applied to the synchronizing pulse separator 18, of well-known form. The function of the apparatus 18 is to remove all the picture information from the video signal, thereby leaving only the synchronizing signals. These synchronizing signals are separated into two parts to control the two-dimensional picture appearing on the screen of the picture tube 17. For vertical synchronization the signal is normally integrated and the circuits are adjusted in such a way that the vertical sweep is started when this signal exceeds a specified level. For horizontal synchronization, there are several different arrangements used commercially. The circuit in accordance with the invention (which is shown in Fig. 2) is used for this horizontal synchronization and replaces the fly-wheel synchronizing circuit often used in modern television receivers. One output 19 of the synchronizing pulse stripper is used to control the vertical sweep generator 20 which may be of any well-known form and the output of this generator is amplified by any suitable amplifier 21 and supplied to the deflection yoke 22 around the neck of the picture tube 17. The horizontal synchronizing pulses 23 are applied to the automatic frequency controlled horizontal sweep generator circuit 24 (to be described below in connection with Fig. 2) and the output thereof applied through any suitable sweep amplifier 25 to the deflection yoke 22 to provide the horizontal sweep to the beam in the tube. The waves from the amplifiers 21 and 25 applied respectively to the vertical and horizontal deflection coils on the yoke 22 around the neck of the picture tube 17 control the deflection of the beam produced therein in well-known manner to form a rectangular "raster" on the screen of the tube.

Reference will now be made to Fig. 2 for a detailed description of the apparatus shown in the box 24 of Fig. 1. Briefly described, the circuit of Fig. 2 comprises a synchronizing pulse amplifier and clipper tube $V1_A$, a phase inverter tube $V1_B$, a clamping diode V2, a blocking oscillator $V3_A$, a sweep circuit discharge tube $V3_B$, a direct-current amplifier $V4_B$, and a cathode follower output tube $V4_A$.

Negative horizontal synchronizing pulses of about 2 to 4 volts amplitude are applied to the input leads 30 and 31 of the circuit shown in Fig. 2. These pulses are differentiated by the coupling condenser 32 and the resistor 41 in the input circuit of the tube $V1_A$ and these differentiated pulses are sufficient to cut off the tube $V1_A$ for a short period of time such as, for example, about 2 microseconds. The pulses are applied to the tube $V1_A$ through an anti-sing resistor 34. The anode of the tube $V1_A$ is connected to the positive terminal 35 of a direct-current source 36, the negative terminal 37 of which is connected to ground, through resistors 38 and 39. By way of example, the source 36 has a voltage output of about 300 volts. A condenser 36A is supplied to provide some filtering for the source 36. The common terminal of resistors 38 and 39 is connected to ground through condenser 40. The common terminal of the condenser 32 and resistor 34 is connected to the positive terminal 35 of the source 36 through a resistor 41 of the order of one megohm, for example. Appropriate values are given the circuit constants described above (examples of which are given on the drawing) so that the tube $V1_A$ functions as an amplifier and clipper.

The output of the tube $V1_A$ is applied through a coupling condenser 42 and anti-sing resistor 43 to the grid of the phase inverting tube $V1_B$. The tube $V1_B$ has a grid leak resistor 48 in its input circuit. The anode of this tube is connected to the positive terminal 35 of the direct-current source 36 through resistor 44 while the cathode is connected to ground through resistors 45 and 33. The resistance of the element 44 is made equal to the total resistance of the elements 45 and 33 so that equal amounts of signal voltages due to plate current changes result in the output of this tube. These output voltages are applied by means of the coupling condensers 46 and 47 to the double diode clamping tube V2. Regenerative feedback from the tube $V1_B$ to the tube $V1_A$ is provided by splitting the cathode resistance to the tube $V1_B$ into two parts 45 and 33, the resistor 33 being common to both of these tubes.

The tubes $V3_A$ and $V3_B$ and their associated circuit elements make up the circuit for producing a saw-tooth wave for horizontal sweep purposes. The tube $V3_A$ is connected as a blocking oscillator. The anode of this tube is connected through the primary winding 50 of a transformer 51 to the positive terminal 35 of the direct-current power supply 36. The secondary winding 52 of the transformer 51 has one of its terminals connected through a resistor 53 and resistor 54 to the positive terminal 35 of the power supply and its other terminal connected through the anti-sing resistor 55 to the control element of the tube $V3_A$. The cathode of this tube is connected to ground. The condenser 56 is connected between the upper terminal of the winding 52 (that is, the terminal connected to the direct-current power supply) and ground. This connection to the positive terminal of the power supply makes this tube normally free-running in the absence of synchronizing pulses and it oscillates in the well-known manner of blocking oscillators. The tube $V3_B$ serves as a discharge tube for the sweep condenser 57 which is connected between ground (the cathode potential of tube $V3_B$) and the anode of this tube, the anode being connected to the positive terminal 35 of the direct-current power supply through resistors 58 and 59. The lower terminal of the secondary winding 52 is connected to the grid of tube $V3_B$ through an anti-sing resistor 60. Since the grids and cathodes of the tubes $V3_A$ and $V3_B$ are connected in parallel, the sweep condenser 57, which has been previously charged by the direct-current source 36 through the resistors 58 and 59, is discharged in synchronism with the blocking oscillator pulse through the discharge path of the tube $V3_B$. The sweep voltage across the sweep condenser 57 is connected through an anti-sing resistor 61 to the grid of the tube $V4_A$ which is a cathode follower tube. The saw-tooth wave appearing at the cathode of tube $V4_A$ is coupled to the common terminal of the resistors 58 and 59 by means of the coupling condenser 62. This causes substantially the same potential variations to appear at both ends of the resistor 58 and consequently a substantially constant charging current is obtained by the sweep condenser 57. This method of linearizing a sweep voltage is sometimes referred to as a "boot strap" circuit.

The output saw-tooth voltage wave which appears between the output terminal 90 (connected directly to the cathode of the tube $V4_A$) and the grounded terminal 91 is also applied through a resistance and capacitance network shown in the box 63 and a coupling resistor 64 in series with this network to plate 65 in the clamping double diode tube V2 and also to cathode 68 in this tube. The cathode 66 of the left-hand diode is connected to the coupling condenser 46 while the anode 67 of the right-hand diode is connected to the coupling condenser 47. Connected between the right-hand terminals of the condensers 46 and 47 are two equal resistors 69 and 70 in series, the common terminal 71 of which is connected to an inner terminal 72 of a potentiometer 73 one terminal of which is connected to ground and the other terminal of which is connected through resistor 74 to the positive terminal 35 of the source 36. Movement of the inner terminal 72 of the resistor 73 provides the horizontal hold control.

When the double diode tube V2 is not conducting (that is, in the absence of a synchronizing pulse) the saw-tooth output voltage from the tube $V4_A$ appears on electrodes 65 and 68 but no current other than the stray capacity charging current flows through the network 63 and the resistor 64.

During a synchronizing pulse, the diode V2 is rendered conducting by oppositely-poled clamping pulses applied to it from the tube $V1_B$. At this time, therefore, point A (potential of the cathode 68 and of the anode 65) is effectively connected to a fixed potential determined by the setting of the horizontal hold control 72, and a current flows in the network 63 and in the resistor 64 proportional to the difference between this potential and the instantaneous sweep voltage. It is apparent that if the sum of the potential across the network 63 and the potential supplied by the horizontal hold control (at node 71) is equal to the average potential of the sweep wave on the cathode of $V4_A$ during the clamping interval, then no net charge flows through the network 63 during the clamping interval. As a result, the potential across this network is left unchanged. On the other hand, if the fly-back should shift to an earlier or later time, a net charge will be drawn through the network 63 in one direction or the other and the potential difference across the network will be changed to a new equilibrium. The potential difference across the network 63 is thus a measure of the relative phase of the sweep fly-back and the corresponding synchronizing pulse and can be used to stabilize the blocking oscillator $V3_A$.

However, the saw-tooth output voltage also appears on both terminals of the network 63 and since it is only the potential difference across this network which can be utilized advantageously, it is necessary to suppress the effect of the saw-tooth upon the direct-current amplifier tube V4B. This is achieved by utilizing a $\mu$ bridge circuit to control the plate current of the tube V4B. A "$\mu$ bridge" circuit is a bridge circuit for the measurement of the amplification factor of a tube and is essentially a one tube differential amplifier which is responsive only to the difference between two signals supplied to its two input connections for application to the cathode and control grid. The differential action is achieved by appropriate choice of circuit constants in a manner explained hereinbelow.

The tube V4B has its anode connected through the resistor 54 to the positive terminal 35 of the direct-current source and its cathode connected through resistors 80 and 81 to the negative terminal 82 of a direct-current source 83, the positive terminal 84 of which is connected to ground, and through resistors 80 and 85 to the cathode of the tube V4A. The grid of the tube V4B is connected to the common terminal of the network 63 and the resistor 64 through the anti-sing resistor 86.

For an explanation of the $\mu$ bridge circuit referred to above, consider a triode in which a voltage $\Delta e_g$ is applied to the grid and simultaneously a voltage $\Delta e_c$ is applied to the cathode. The change in plate current ($\Delta i_p$) is given by the expression:

$$\Delta i_p = \left(\frac{\delta i_p}{\delta e_g}\right)\Delta e_g + \left(\frac{\delta i_p}{\delta e_c}\right)\times \Delta e_c \qquad (1)$$

For $\Delta i_p$ to be zero requires that:

$$\frac{\Delta e_c}{\Delta e_g} = \frac{\delta i_p}{\delta e_g} \Big/ \frac{\delta i_p}{\delta e_c} = \frac{\mu}{1+\mu} \qquad (2)$$

where $\mu$ is the amplification factor of the tube and is equal to $$\left.\frac{\delta e_p}{\delta e_g}\right|_{i_p \text{ const.}}$$

Figure 6:
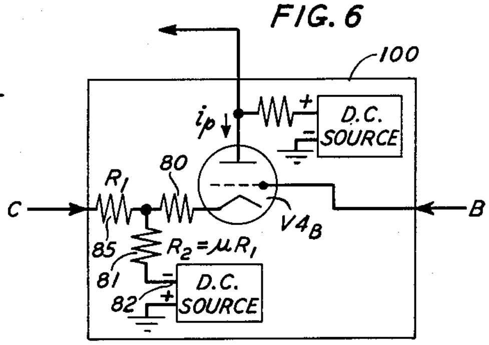

Now referring to Fig. 6, which shows the $\mu$ bridge circuit 100 including the tube V4B, and assuming $\Delta i_p = 0$, the above condition represented by Equation 2 is satisfied if $$\frac{R_2}{R_1 + R_2} = \frac{\mu}{1+\mu}$$

or $$R_2 = \mu R_1$$

With this condition met, the potential variations common to both sides of the network 63 (points B and C) will not be amplified. Nevertheless, the potential difference across the network 63, as a result of a phase difference between the sweep fly-back and the synchronizing pulse, is amplified by the tube V4B and appears as a proportional change in plate voltage. This plate voltage determines the speed at which the condenser 56 in the grid circuit of the blocking oscillator tube V3A will recharge. Consequently, the oscillator frequency is increased or decreased as the voltage on the plate of the tube V4B is increased or decreased, respectively. An increase in the blocking oscillator frequency advances the fly-back in time, and conversely, a decrease retards it. The polarities of connections in the circuit are made such that if the time of fly-back is, for example, too early, the plate voltage of V4B is lowered and the oscillator frequency is decreased. It is evident that here (as in any AFC or AVC circuit) the action can be analyzed in the light of the theory developed for negative feedback amplifiers. Here the input quantity is the time of occurrence of the signal pulse and the output quantity is the time of occurrence of the fly-back. A signal is developed proportional to the difference between these two times and this signal (amplified by the $\mu$ circuit) determines the output quantity. In order to better understand the operation and characteristics of the circuit shown in Fig. 2 it is advisable to study its loop gain characteristic. Since in this circuit the input and output quantities are compared directly to develop the net (or error) signal to the $\mu$ circuit, it is evident that $\beta = -1$ where $\beta$ is the amplification of the feedback loop.

If we let:

$\theta_i$=input quantity (departure of clamping or sync pulse from regular reference time of occurrence)

$\theta_0$=output quantity (departure of fly-back time from regular reference time of occurrence of sync pulse)

$\Delta\theta$="tracking" error$=\theta_i-\theta_0$, we then have $$\frac{\theta_0}{\theta_i} = \frac{\mu}{1-\mu\beta} = \frac{\mu}{1+\mu} \qquad (3)$$

So long as $\mu$ is high, the external gain of the system is very nearly unity, so the output follows the input. Stating this another way, $$\frac{\Delta\theta}{\theta_i} = \frac{\theta_i - \theta_0}{\theta_i} = 1 - \frac{\mu}{1+\mu} = \frac{1}{1+\mu} \qquad (4)$$

and thus over the range for which $\mu >> 1$, the tracking error is small. That is to say, if $\mu$ is high at low frequencies, for example, then low frequency variations in the time of occurrence of the synchronizing pulse cause equal variations in the time of occurrence of fly-back and the system is able to follow such variations with relatively little sweep timing error. The successful operation of an AFC sweep circuit rests on the assumption that the true synchronizing pulse (undisturbed by noise) varies in frequency (phase) only very slowly. Under this assumption, any rapid fluctuations in time of occurrence of synchronizing pulse can be disregarded as being specious (that is, due to noise or other interfering effects).

It is apparent from the above that the accuracy and quality of stabilization obtained from an AFC circuit depends principally upon the shape of the loop gain characteristic, $\mu(\omega)$. Of particular interest are (1) the frequency of gain crossover ($\omega_c$), which largely determines the frequency range over which the system responds, and (2) the phase margin of the system in the vicinity of gain crossover, which determines the amount by which disturbances in this frequency range are enhanced (if at all).

The factors affecting the loop gain of this circuit are:

(1) The rate of change of voltage across the network 63 with respect to the phase difference between the fly-back and clamping pulse.

(2) The amplification of V4B.

(3) The rate of change of frequency of the blocking oscillator with respect to the plate voltage of V4B.

(4) The relation between the phase of fly-back and frequency of the blocking oscillator.

(5) The filter characteristic of the network 63 and its asociated charging circuit.

Figure 3:
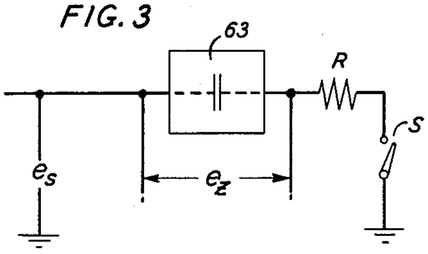
Figs. 3 to 9 inclusive are diagrams and graphical representations used to explain the operation and characteristics of the circuit shown in Fig. 2.
Figure 4:
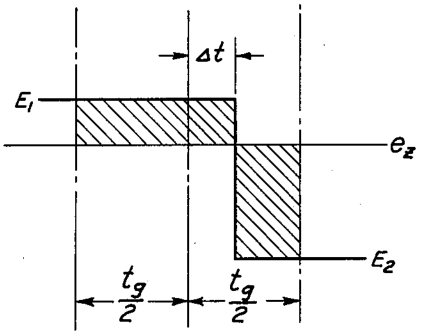
Figure 5:
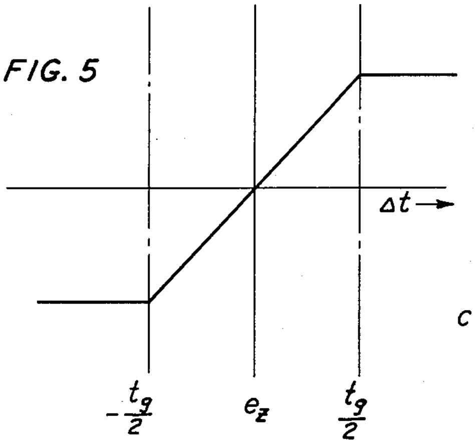

The first factor can be best visualized by reference to Figs. 3, 4 and 5. Fig. 3 is a simplified representation of the network 63 and its associated charging circuit. The action of the clamping tube V2 is here shown as a switch S, assumed to be closed periodically, i. e., during each clamping pulse. Actually, a source of electromotive force, representing the potential determined by the horizontal hold control could be shown in series with this switch, but for simplicity has been omitted. The network 63 may in fact consist of several circuit elements, but at high frequencies and very low frequencies must behave essentially as a capacity. The current drawn through the network during the clamping time will then depend only upon the voltages $e_s$ and $e_z$ and upon the resistance R.

Fig. 4 shows the voltage-time relationships during the clamping interval. The heavy line in this figure represents the voltage $e_s$ in the vicinity of fly-back, and the outer vertical dashed lines are the limits of the clamping interval. The current flowing into the network is evidently equal to $$\frac{E_1 - e_z}{R}$$

for $$\frac{t_g}{2}<t<\Delta t$$

and $$\frac{E_2-e_z}{R}$$

for $$\Delta t<t<\frac{t_g}{2}$$

Hence, if $q$ is the charge which flows through resistance R, $$qR=(E_1-e_z)\left(\frac{t_g}{2}+\Delta t\right)+(E_2-e_z)\left(\frac{t_g}{2}-\Delta t\right)$$

$$=(E_1-E_2)\Delta t-e_z t_g$$

$$=E_s\Delta t-e_z t_g \quad (5)$$

$$q=\frac{1}{R}(e_s\Delta t-e_z t_g) \quad (6)$$

Equilibrium will be reached when $q=0$, that is, when the shaded areas in Fig. 4 are equal. In this case, $$e_z=\frac{E_s\Delta t}{t_g}\left(-\frac{t_g}{2}<\Delta t<\frac{t_g}{2}\right) \quad (7)$$

Hence $e_z$ as a function of $\Delta t$ will be as shown in Fig. 5. Actually, of course, because the fly-back is not instantaneous, and because the clamping pulse is not strictly rectangular, the true characteristic will not consist of three straight lines as shown but of a smooth curve. It should be noticed that since the initial and final values of this control characteristic are $E_2$ and $E_1$ respectively, the slope of the characteristic will be inversely proportional to the gate time ($t_g$), so that the low frequency loop gain, paradoxically enough, is inversely proportional to the duration of the clamping pulse.

Factors 2 and 3 are straightforward enough that no explanation need be given here.

Factor 4 is the familiar effect that occurs whenever one controls frequency and compares phase. Since the phase of a wave is the time integral of its frequency, the effect is to add a factor $$\frac{1}{j\omega}$$

into the loop gain expression.

Factor 5 can be readily computed under the assumption that the transient response of the network 63 and its associated charging circuit is of long duration as compared to the interval between clamping times. Under this assumption, the action is equivalent to that of a similar circuit in which the charging resistor R is replaced by a resistor $$\frac{R}{\delta}$$

where $\delta$ equals the clamping duty cycle.

The loop gain of the actual circuit is determined experimentally as follows:

First, the hold control 72 is turned in one direction until the circuit just "pops out" of synchronism and then in the other direction until "pop-out" is again reached, and the plate voltages of $V4_B$, after "pop-out," are noted. As the hold control 72 is varied with the circuit synchronized, the relative phase of clamping pulse and the fly-back shifts in order to reestablish equilbrium. The limit of stable operation is reached when the fly-back coincides with either edge of the clamping pulse. If this limit is just exceeded, the circuit drops out of synchronism and the saw-tooth output is sampled at random times by the clamp circuit. Under this condition, tube $V4_B$ has applied to it a voltage corresponding to that which would exist at one limit of the control characteristic in Fig. 5. The difference between the plate voltage of $V4_B$ under the two "pop-out" conditions divided by the width of the clamping pulse therefore gives the slope of the control characteristic in Fig. 5 times the gain of $V4_B$. An actual measurement, for example, showed a change of 76 volts between 2 $\mu$ sec. extremes: that is, a slope of 38 volts/$\mu$ sec. This measurement gives the combined results of factors 1 and 2.

Figure 7:
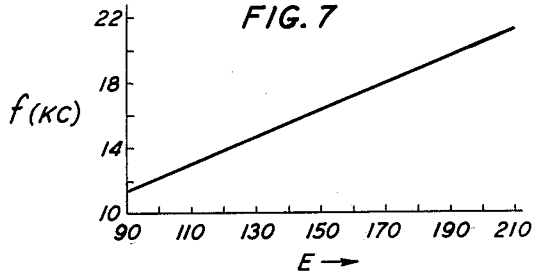

Secondly, the free-running blocking oscillator frequency as a function of plate voltage of V4 is observed and plotted. In a specific example, it was found to have a slope of 83 cycles/volt sec., as shown in Fig. 7. This gives factor 3.

From these measurements, and factor 4, the asymptotic loop gain characteristic can be computed; that is, the gain characteristic neglecting the filter characteristic of network 63 and its charging circuit. This asymptotic characteristic has a gain crossover at a frequency $\omega_0$ given by the Expression 8 below (noting that at 15,750 cycles per second there are 63.5 microseconds per cycle):

$$\left|\frac{1}{j\omega_0}\left(38\,\frac{\text{volts}}{\mu\text{ sec}}\right)\left(63.5\,\frac{\mu\text{ sec}}{\text{cycle}}\right)\left(83\,\frac{\text{cycles}}{\text{volt sec}}\right)\right|=1 \quad (8)$$

$$\omega_0=201,000$$

$$f_0=33,000 \text{ c. p. s.}$$

Figure 8:
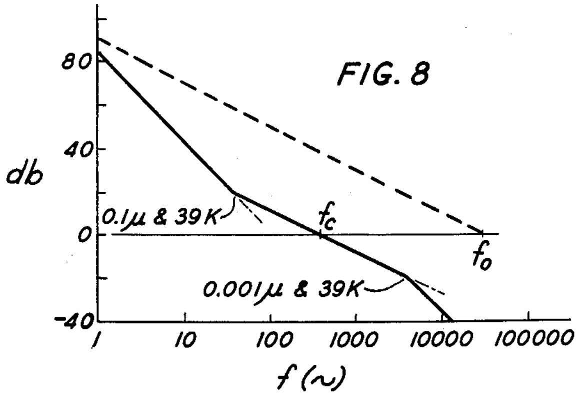

The asymptotic gain characteristic is shown as the dotted line in Fig. 8. The solid line in this figure results from the modification of this asymptotic characteristic by the filter characteristic of the network 63 (factor 5). With a 2 $\mu$ sec clamping pulse, the clamping duty cycle is $$\frac{2.}{63.5}$$

so that a .1MΩ charging resistor becomes effectively $$.1\times\frac{63.5}{2.}=\text{approximately } 3.18M\Omega$$

This resistance in conjunction with the .1$\mu f$ condenser in the network 63 produces a corner at about .5 cycles per second, so that above this frequency, the actual characteristic falls at 12 decibels per octave for a considerable ways. To assure adequate phase margin in the vicinity of gain crossover, a second corner is placed at 40 cycles by adding a 39,000-ohm resistor in series with the .1$\mu f$ condenser. The loop gain thus passes through gain crossover at 6 decibels per octave. Finally, this 39,000-ohm resistor is shunted by a 1,000 $\mu\mu f$ condenser to restore the essentially capacitive behavior of the network during the clamping time. As a result of this shunting condenser, a third corner is introduced at 4 kilocycles, above which frequency the loop gain again falls at 12 decibels per octave. The resulting characteristic has a gain crossover at 400 cycles per second, with a phase margin of about 78 degrees. The loop is therefore highly stable and no appreciable gain enhancement of noise components exists at any frequency.

While, as has been seen above, the clamping pulse width affects the asymptotic loop gain, and also (because of the duty cycle effect on the charging resistor) the frequency of the first corner in the loop gain characteristic, these effects are compensating so that the actual high frequency loop gain as shown by the solid line in the figure is independent of the duration of the clamping pulse. As a result the duration of the clamping pulse can be changed radically without affecting the stability of the circuit in the locked condition. As the clamping pulse is made shorter, the asymptotic gain crossover, $\omega_0$, of the system increases, and the phase stability increases in direct proportion. That is, drifts in the circuit will produce less phase shift of the saw-tooth with respect to the synchronizing pulses, with a short clamping pulse than with a long one. However, the shorter the clamping pulse is made, the more difficult it becomes to get the circuit locked into synchronism initially. With a 2 $\mu$ sec. clamping pulse, the phase stability is about twenty times that of the sine wave synchronizing circuit used generally today and synchronization is achieved quite easily.

The actual loop gain characteristic shown in Fig. 8 is not necessarily the optimum for use in a television receiver. In particular, it might be desirable to lower the frequency of gain crossover and thus provide greater noise immunity. To change the frequency of gain crossover, by a factor $$\frac{1}{n}$$

for example, the $.1\mu f$ condenser in network 63 should be changed by the factor $n^2$ and the 39,000-ohm resistor by the factor $$\frac{1}{n}$$

The 1,000 $\mu\mu f$ condenser may be left unchanged. Too great a reduction in the frequency of gain crossover will result in annoyingly long lock-in time.

Figure 9:
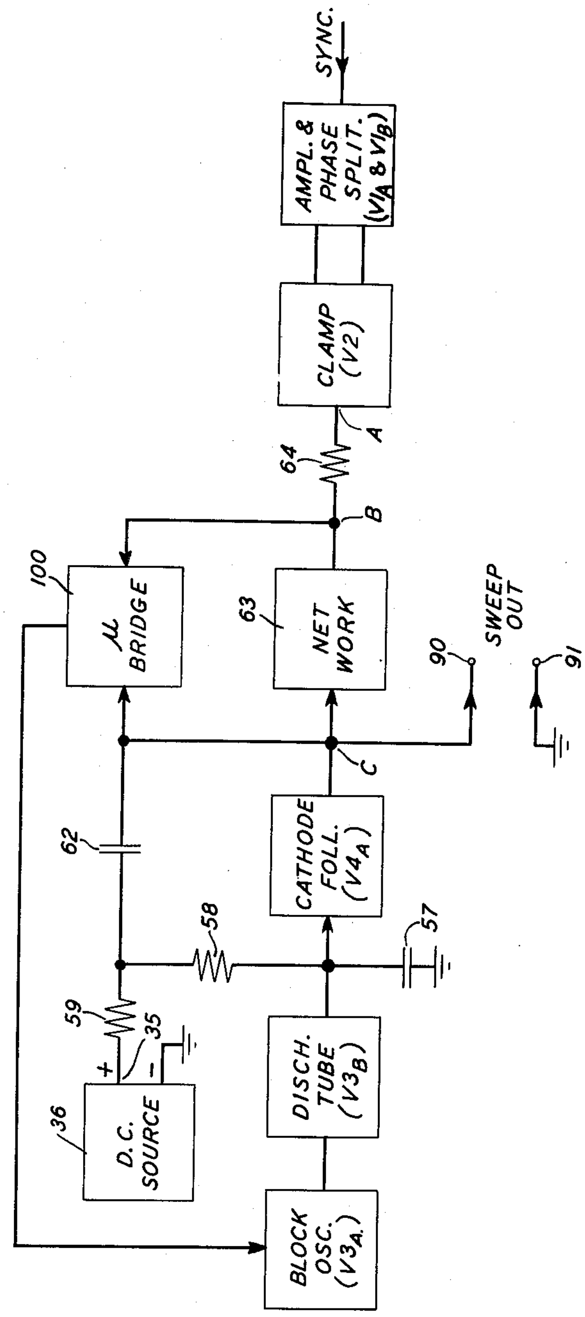

Fig. 9 is a schematic block diagram of the major elements described above. This diagram is provided to show in a simplified form the relation of these elements to each other. The elements have been identified by reference characters which are respectively the same as those used to identify the corresponding elements in the other figures.

It is to be understood that the above-described arrangement is illustrative of the application of the principles of the invention, but numerous other arrangements may be devised by those skilled in the art without departing from the spirit and scope of the invention. Moreover, it is to be understood that the specific numerical constants and values given in the specification and drawings are merely by way of example and may be varied in many cases considerably from the values given.

What is claimed is:

1. In a television receiver, input means having television signals containing synchronizing signals applied thereto, means for separating from said television signals line synchronizing pulses, a two terminal integrating network comprising a first capacitor and a second capacitor in series therewith, said second capacitor being shunted by a resistance, a source of D.-C. potential, a clamper circuit, means including a voltage divider network connected between said source and said clamper circuit for establishing a D.-C. reference potential, said clamper circuit being connected through a resistance to one terminal of said integrating network, said clamper circuit being energized by said line synchronizing pulses for intermittently connecting said reference potenial to said one terminal of said integrating network, a sweep generator circuit including an oscillator and a capacitance for generating sweep waves, said oscillator having a frequency determining circuit, means for applying said sweep waves to the other terminal of said network in the same polarity as said reference potential, differential amplifying means responsive to a potential difference across said integrating network during the period the clamper circuit is energized for producing a frequency control signal, said amplifying means having at least two input electrodes, one of said electrodes being connected to one terminal of said integrating network and the other of said electrodes being connected to the other terminal of said network, a source of bias potential connected to said one terminal of said integrating network through at least one resistance and to said one electrode through one or more resistances, said first capacitor of said integrating network having a value such that said one electrode is so biased relative to said other electrode that potential variations common to both sides of said network are not amplified, and means for applying said frequency control signal to said frequency determining circuit of said oscillator to shift the oscillator frequency.

2. In a television receiver, input means having television signals containing synchronizing signals applied thereto, means for separating from said television signals line synchronizing pulses, a two terminal integrating network comprising a first capacitor and a second capacitor in series therewith, said second capacitor being shunted by a resistance, a source of D.-C. potential, a clamper circuit, means including a voltage divider network connected between said source and said clamper circuit for establishing a D.-C. reference potential, said clamper circuit being connected through a resistance to one terminal of said integrating network, said clamper circuit being energized by said line synchronizing pulses for intermittently connecting said reference potential to said one terminal of said integrating network, a sweep generator circuit including an oscillator and a capacitance for generating sweep waves, said oscillator having a frequency determining circuit, mean for applying said sweep waves to the other terminal of said network in the same polarity as said reference potential, differential amplifying means responsive to a potential difference across said integrating network during the period the clamper circuit is energized for producing a frequency control signal, said amplifying means having at least two input electrodes, one of said electrodes being connected to one terminal of said integrating network and the other of said electrodes being connected to the other terminal of said network, a source of bias potential connected to said one terminal of said integrating network through a first and second resistor and to said one electrode through said first resistor and a third resistor, said third resistor being connected between said electode and the junction of said first and second resistors, said first capacitor of said integrating network having a value such that said one electrode is so biased relative to said other electrode that potential variations common to both sides of said network are not amplified, and means for applying said frequency control signal to said frequency determining circuit of said oscillator to shift the oscillator frequency.

3. In a television receiver, input means having television signals containing synchronizing signals applied thereto, means for separating from said television signals line synchronizing pulses, a two terminal integrating network comprising a first capacitor and a second capacitor in series therewith, said second capacitor being shunted by a resistance, a source of D.-C. potential, a clamper circuit, means including a voltage divider network connected between said source and said clamper circuit for establishing a D.-C. reference potential, said clamper circuit being connected through a resistance to one terminal of said intergating network, said clamper circuit being energized by said line synchronizing pulses for intermittently connecting said reference potential to said one terminal of said integrating network, a sweep generator circuit including an oscillator and a capacitance for generating sweep waves, said oscillator having a frequency determining circuit, means for applying said sweep waves to the other terminal of said network in the same polarity as said reference potential, differential amplifying means comprising a vacuum tube responsive to a potential difference across said integrating network during the period the clamper circuit is energized for producing a frequency control signal, said vacuum tube having a control grid and a cathode, said cathode being connected to one terminal of said integrating network and said grid being connected to the other terminal of said network, a source of bias potential connected to said one terminal of said integrating network through a first and second resistor and to said cathode through said first resistor and a third resistor, said third resistor being connected between said electrode and the junction of said first and second resistors, said first resistor being $\mu$ times said second resistor where $\mu$ is the amplification factor of said differential amplifier and said first capacitor of said integrating network having a value such that said control grid is so biased relative to said cathode that potential variations common to both sides of said network are not amplified, and means for applying said frequency control signal to said frequency determining circuit of said oscillator to shift the oscillator frequency.

4. In a frequency control system, input means having television signals containing synchronizing signals applied thereto, means for separating from said television signals line synchronizing pulses, a two terminal integrating network comprising a first capacitor and a second capacitor in series therewith, said second capacitor being shunted by a resistance, a source of D.-C. potential, an electronic switch, means including a voltage divider network connected between said source and said switch for establishing a D.-C. reference potential, said switch being connected through a resistance to one terminal of said integrating network, said switch being closed by said line synchronizing pulses for intermittently connecting said reference potential to said one terminal of said integrating network, a sweep generator circuit including an oscillator and a capacitance for generating sweep waves, said oscillator having a frequency determining circuit, means for applying said sweep waves to the other terminal of said network in the same polarity as said reference potential, differential amplifying means responsive to variations in potential level across said integrating network during the period the switch is energized for producing a frequency control signal, said amplifying means having at least two input electrodes, one of said electrodes being connected to one terminal of said integrating network and the other of said electrodes being connected to the other terminal of said network, a source of bias potential connected to said one terminal of said integrating network through at least one resistance and to said one electrode through one or more resistances, said amplifying means, said bias source and said resistances comprising a $\mu$-bridge circuit in which said one electrode is biased relative to said other electrode and said first capacitor of said integrating network has a value such that potential variations common to both sides of said network are not amplified, and means for applying said frequency control signal to said frequency determining circuit of said oscillator to shift the oscillator frequency.

References Cited in the file of this patent

UNITED STATES PATENTS

| | | |
|---|---|---|
| 2,344,810 | Fredendall | Mar. 21, 1944 |
| 2,460,112 | Wright et al. | Jan. 25, 1949 |
| 2,492,090 | Bass | Dec. 20, 1949 |
| 2,519,911 | Kuperus | Aug. 22, 1950 |
| 2,540,167 | Houghton | Feb. 6, 1951 |

OTHER REFERENCES

Rider's Television Manual, vol. # 4, General Electric TV, pages 4–29, GE Model 818, Manual Copyright date Nov. 25, 1949.

Radio and Television News, February 1950, pages

Proceedings of I. R. E., May 1949, pages 497–499.

43–46.